(12) United States Patent
Jones et al.

(10) Patent No.: US 8,965,329 B1
(45) Date of Patent: Feb. 24, 2015

(54) TRANSMISSION OF WIRELESS COMMUNICATION DEVICE STATUS INFORMATION

(75) Inventors: Bryce A. Jones, Overland Park, KS (US); Benjamin Michael Wilson, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 101 days.

(21) Appl. No.: 13/164,489

(22) Filed: Jun. 20, 2011

(51) Int. Cl.
*H04M 11/04* (2006.01)
(52) U.S. Cl.
USPC ............... 455/404.2; 455/456.1; 455/456.2; 455/466; 455/412.2; 455/414.2; 340/988; 340/426.15
(58) Field of Classification Search
USPC ............. 455/404.1–404.2, 456.1–456.6, 466, 455/412.2, 414.1–414.2, 414.4, 423–425, 455/421, 422.1, 432.1, 435.1, 436–444; 340/988–994, 426.15
See application file for complete search history.

(56) References Cited

U.S. PATENT DOCUMENTS

| | | | |
|---|---|---|---|
| 6,650,896 B1* | 11/2003 | Haymes et al. | 455/423 |
| 6,721,572 B1* | 4/2004 | Smith et al. | 455/456.1 |
| 6,798,355 B2 | 9/2004 | Flick | |
| 7,412,231 B1 | 8/2008 | Kelleher | |
| 2004/0192352 A1 | 9/2004 | Vallstrom et al. | |
| 2006/0019650 A1* | 1/2006 | Kedem | 455/422.1 |
| 2007/0243851 A1* | 10/2007 | Shoarinejad et al. | 455/343.2 |

* cited by examiner

*Primary Examiner* — Wayne Cai (57) ABSTRACT

A wireless communication device comprises a processing system, a memory system, and a wireless communication transceiver. The processing system is configured to maintain device status information in the memory system of the wireless communication device, encode the device status information to generate an update status message in a bitstream protocol, and detect a condition of the wireless communication device which could impede a connection with a wireless access node. The wireless communication transceiver is configured to, in response to the processing system detecting the condition of the wireless communication device, transmit the update status message before the connection with the wireless access node is lost.

20 Claims, 6 Drawing Sheets

| DEVICE STATUS INFO | USER | LOCATION | BATTERY POWER | AIRPLANE | ROAM | LAST CALLED # | LAST RECEIVIED # |
|---|---|---|---|---|---|---|---|
| VALUE | 487662 | WICHITA | LOW | OFF | TRUE | 555-324-2234 | 555-543-9915 |
| BITSTREAM | 770EE | A4E897C | 3 | 0 | 1 | 14AFFC07A | 14B21492B |

UPDATE STATUS MESSAGE TABLE 400

TRANSMISSION OF WIRELESS COMMUNICATION DEVICE STATUS INFORMATION

TECHNICAL BACKGROUND

The use of wireless communication devices to send and receive information has become increasingly prominent. A communication network that provides a communication service to a wireless communication device typically tracks the location and other information about the device as it travels. However, when a connection between the wireless communication device and the communication network is severed, such as when the device is powered off or when a radio antenna of the device loses contact with a serving wireless access node, the location of the device and other device status information is no longer available to the communication network.

Third-party applications, users of other communication devices, and other communication systems may request to locate a wireless communication device for various reasons. Typically, in response to a location request for a wireless communication device, a communication network will query a home location register (HLR) to determine if the wireless communication device is registered. If the wireless communication device is not registered with the HLR, the communication network determines that the device is not powered on or otherwise not in communication with the communication network, and the requestor attempting to locate the device is informed that the device is not registered. In some cases, the communication network may continue to periodically query the HLR to determine whether the device has registered, which can inefficiently waste HLR resources and burden the SS7 network.

OVERVIEW

A method of operating a wireless communication device is disclosed. The method comprises maintaining device status information in a memory system of the wireless communication device. The method further comprises encoding the device status information to generate an update status message in a bitstream protocol. The method further comprises detecting a condition of the wireless communication device which could impede a connection with a wireless access node. The method further comprises, in response to detecting the condition of the wireless communication device, transmitting the update status message before the connection with the wireless access node is lost.

A wireless communication device comprises a processing system, a memory system, and a wireless communication transceiver. The processing system is configured to maintain device status information in the memory system of the wireless communication device, encode the device status information to generate an update status message in a bitstream protocol, and detect a condition of the wireless communication device which could impede a connection with a wireless access node. The wireless communication transceiver is configured to, in response to the processing system detecting the condition of the wireless communication device, transmit the update status message before the connection with the wireless access node is lost.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
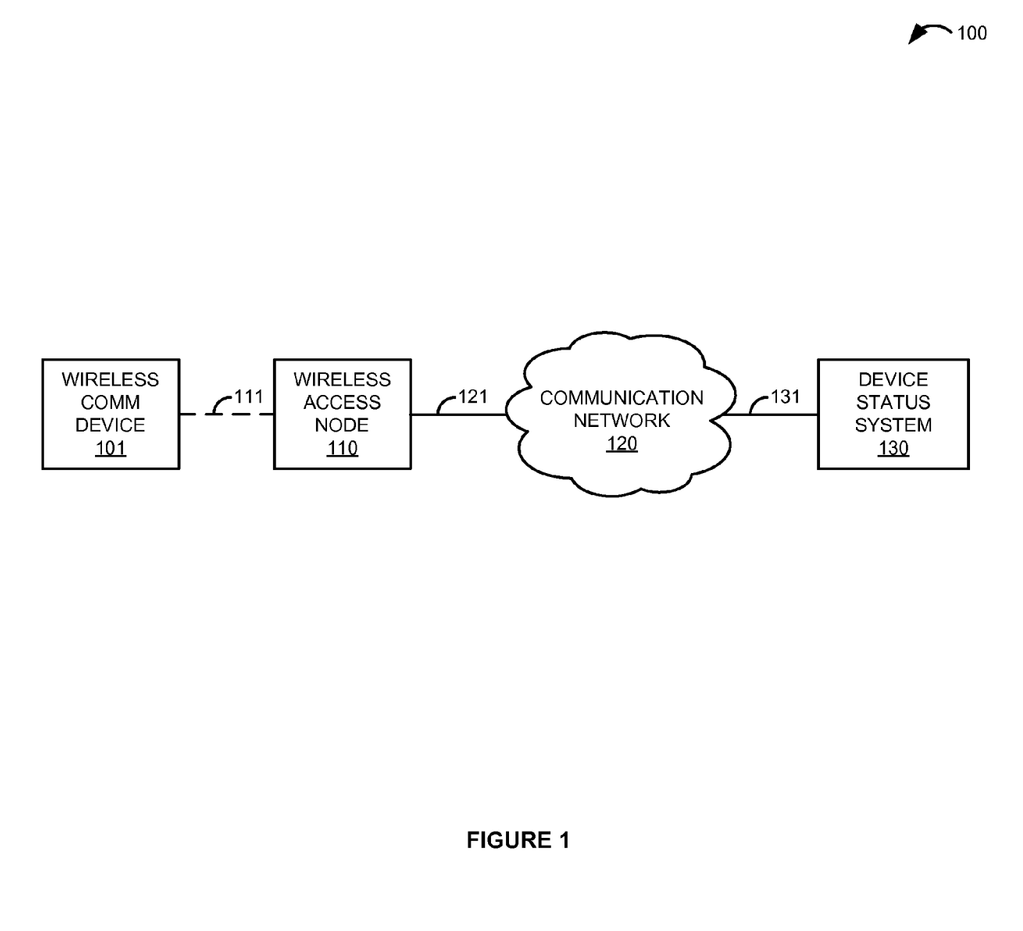
FIG. 1 is a block diagram that illustrates a communication system.

FIG. 1 is a block diagram that illustrates communication system 100. Communication system 100 includes wireless communication device 101, wireless access node 110, communication network 120, and device status system 130. Wireless communication device 101 and wireless access node 110 are in communication over wireless communication link 111. Wireless access node 110 and communication network 120 are in communication over communication link 121. Communication network 120 and device status system 130 communicate over communication link 131.

Figure 2:
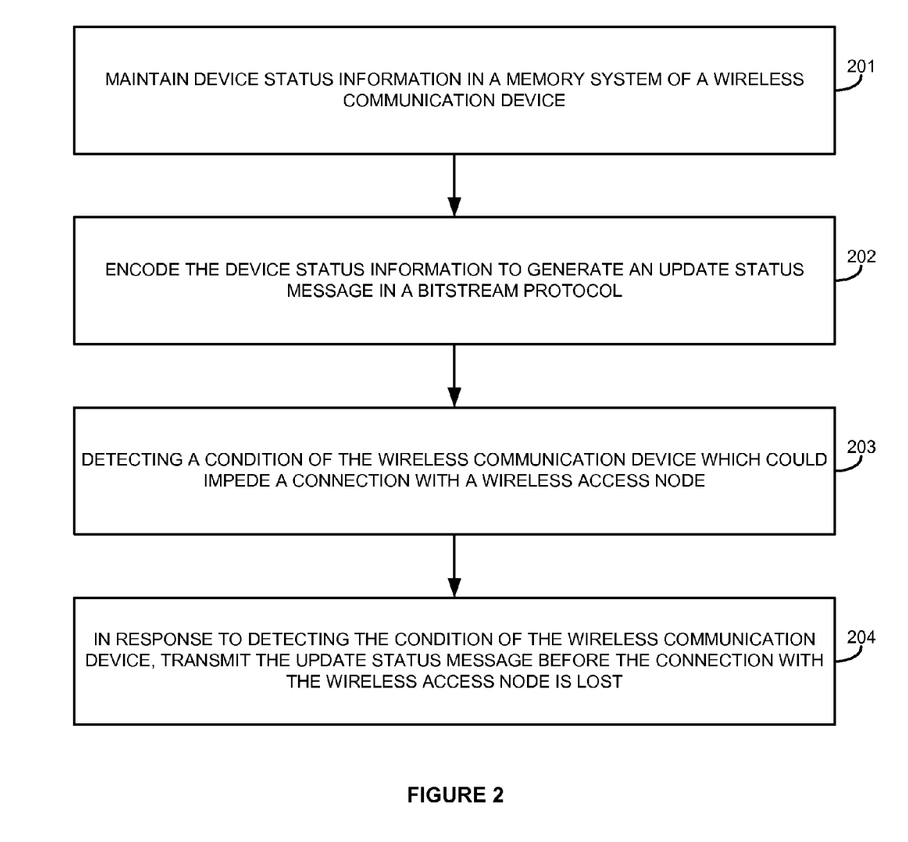
FIG. 2 is a flow diagram that illustrates an operation of the communication system.

FIG. 2 is a flow diagram that illustrates an operation of communication system 100. The steps of the operation are indicated below parenthetically. Initially, wireless communication device 101 maintains device status information in a memory system of wireless communication device 101 (201). The device status information could comprise a variety of metrics associated with a status of wireless communication device 101. For example, the device status information could comprise a location of wireless communication device 101, battery power status, roaming status, device powered on/off status, airplane mode on/off status, received signal strength indicator (RSSI), signal-to-noise ratio (SNR), carrier-to-noise-and-interference ratio (CNIR), and other device status metrics. In some examples, wireless communication device 101 could periodically update the device status information stored in the memory device along with relevant timestamps for the data so that both historical and current device status information is available. In addition, the device status information could comprise telephone numbers previously in contact with wireless communication device 101, including indications of dialed and received calls, failed call attempts, dropped calls, unanswered calls, short message service (SMS) text messages, multimedia service (MMS) messages, instant messages, and any other communications with another user and/or communication device or network, including timestamps thereof. Further, the device status information could include internet web addresses, uniform resource locators (URLs), identifications of email servers, and other communication services and that were utilized by wireless communication device 101, along with the associated timestamps when such services were accessed.

Wireless communication device 101 encodes the device status information to generate an update status message in a bitstream protocol (202). The bitstream protocol of the update status message could comprise any code capable of storing the device status information. For example, the encoding technique used to generate the update status message could utilize different sequences of bits to represent different data items included in the device status information. Each data item could have a unique bit code to represent the data item, followed by another sequence of bits to represent the value of that data item. In another example, a predetermined order of data items that are typically included in the device status information could be utilized, so that only the values of each ordered data item and section delimiters would need to be parsed in order to decode the device status information from the bitstream protocol of the update status message. Other examples of encoding techniques for the bitstream protocol of the update status message are also possible.

Wireless communication device 101 detects a condition of wireless communication device 101 which could impede a connection with wireless access node 110 (203). Typically, wireless communication device 101 detects the condition of wireless communication device 101 which could impede the connection with wireless access node 110 by identifying any indication that a wireless communication transceiver of wireless communication device 101 could lose a wireless signal connection with wireless access node 110. For example, wireless communication device 101 could detect the condition of device 101 by detecting when wireless communication device 101 is powering off or entering airplane mode, which typically occur when a user of device 101 attempts to perform such functions. In addition, wireless communication device 101 could detect the condition by detecting when wireless communication device 101 is roaming or about to roam, or by detecting a reduction in signal strength of the connection with wireless access node 110, which could indicate that device 101 could soon lose a communication link to communication network 120. In other examples, wireless communication device 101 could detect low battery power of wireless communication device 101, which could result in device 101 powering off unexpectedly when the battery power is fully depleted. Other detectable conditions of wireless communication device 101 which could impede the connection with wireless access node 110 are also possible.

In response to detecting the condition of wireless communication device 101, wireless communication device 101 transmits the update status message before the connection with wireless access node 110 is lost (204). Typically, wireless communication device 101 transmits the update status message to wireless access node 110 for delivery to another device or communication system. For example, wireless communication device 101 could be configured to transmit the update status message for delivery to device status system 130. In another example, wireless communication device 101 could be configured to transmit the update status message for delivery to a second wireless communication device, or to a third-party application server (not shown). The update status message could comprise any message format, including an SMS text message, an email message, or an instant message (IM) in some examples.

Advantageously, wireless communication device 101 can detect when a connection with wireless access node 110 might be lost, and responsively transmits the device status information in the update status message to wireless access node 110 before the wireless signal is severed. By pre-storing the device status information and encoding this information into the bitstream protocol to generate the update status message, wireless communication device 101 is prepared to instantaneously transmit the encoded device status information with very short notice. In this manner, interested parties will receive pertinent device status information about wireless communication device 101 up to the moment before the wireless signal serving device 101 was lost.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 120 comprises the core network of a wireless communication service provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 120 may be configured to communicate over metallic, wireless, or optical links—including combinations thereof. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Device status system 130 comprises a processing system and communication transceiver. Device status system 130 may also include other components such as a router, server, data storage system, and power supply. Device status system 130 may reside in a single device or may be distributed across multiple devices. Device status system 130 may be a discrete system or may be integrated within other systems—including other systems within communication system 100. In some examples, device status system 130 could comprise a network switch, mobile switching center, router, switching system, packet gateway, network gateway system, Internet access node, application server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 may be direct links or could include intermediate networks, systems, or devices.

Figure 3:
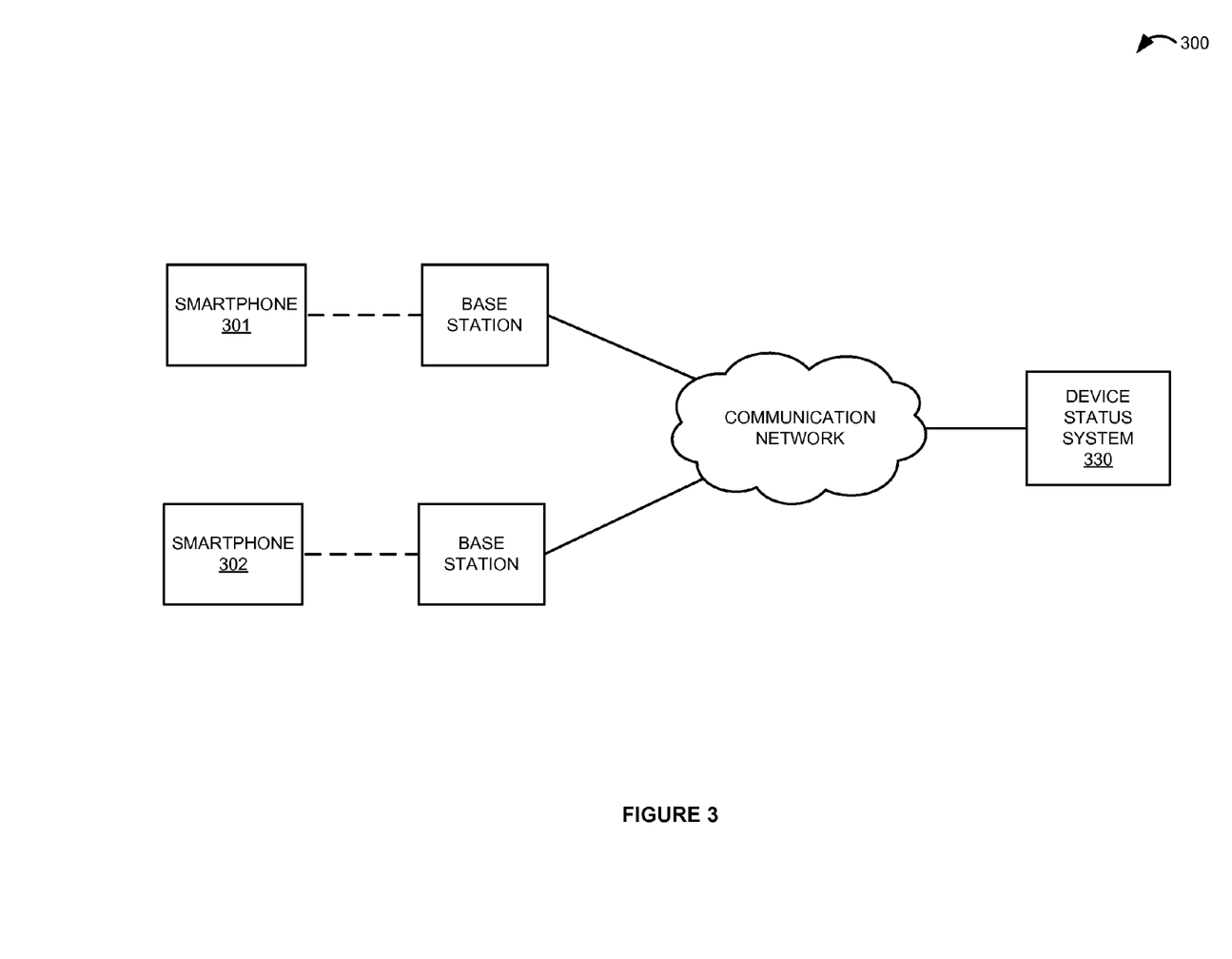
FIG. 3 is a block diagram that illustrates a communication system in an exemplary embodiment.

FIG. 3 is a block diagram that illustrates communication system 300 in an exemplary embodiment. Communication system 300 includes smartphones 301 and 302 and device status system 330. Smartphone 301 provides an example of wireless communication device 101, although device 101 may use alternative configurations. The following description of FIGS. 4 and 5 provides an exemplary technique for transmitting an update status message in the context of communication system 300 as shown in FIG. 3.

Figure 4:
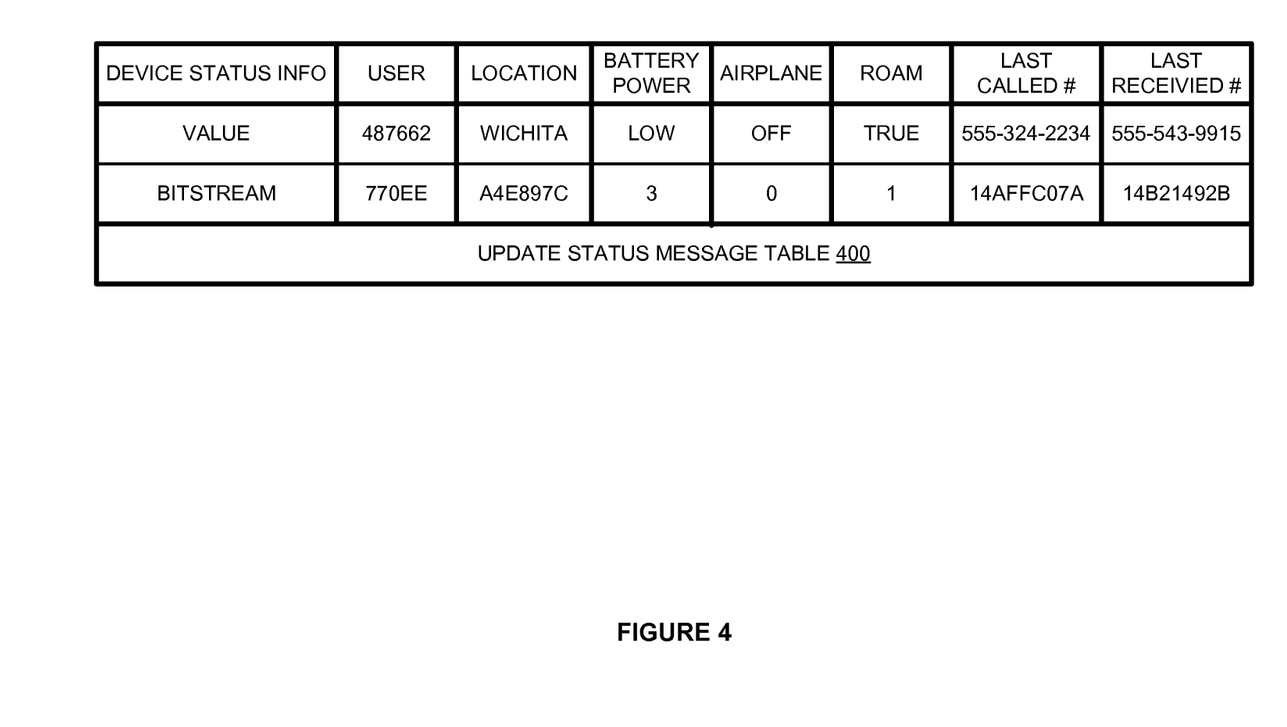
FIG. 4 is a block diagram that illustrates an update status message table in an exemplary embodiment.
Figure 5:
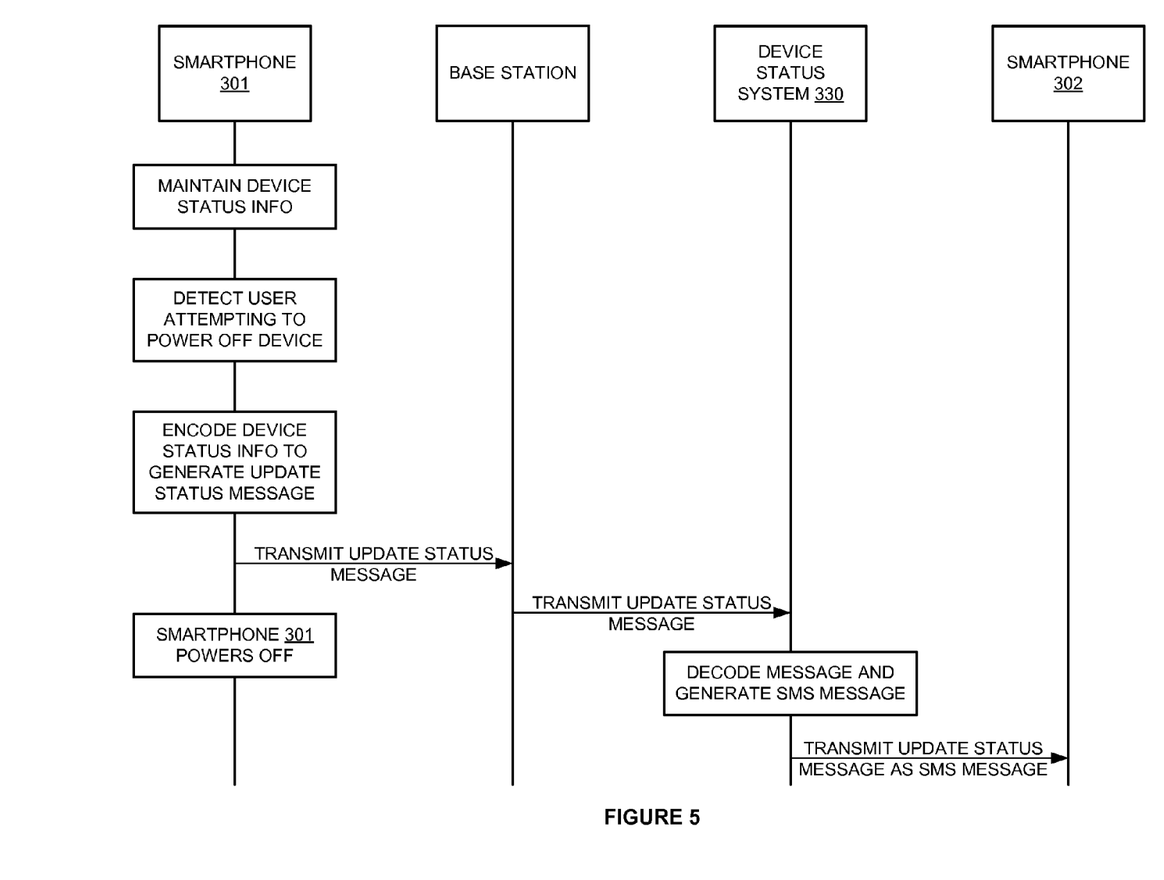
FIG. 5 is a sequence diagram that illustrates an operation of a communication system in an exemplary embodiment.

FIG. 4 is a block diagram that illustrates update status message table 400 in an exemplary embodiment. Update status message table 400 provides a tabular view of device status information categories as shown in the columns of table 400, along with corresponding values for the categories and these same values as encoded in a bitstream protocol in the second and third rows, respectively. The device status information shown in update status message table 400 provides one example of device status information that could be stored by smartphone 301.

The device status information categories are shown along the first row of update status message table 400, and provide a label for each of the columns. In particular, the device status information includes a user identifier field labeled "user", a "location" field, a "battery power" field that indicates remaining battery power, an "airplane" field that indicates an airplane mode of the device, a "roam" field that indicates whether the device was roaming, and "last called #" and "last received #" fields to indicate the telephone numbers that were previously in communication with the device. Of course, additional fields that provide further device status information are also possible, along with greater levels of detail for each of the fields that are shown in table 400. For example, the "location" field could provide an exact location, such as global positioning system (GPS) coordinates or latitude/longitude values instead of simply "Wichita" as shown in FIG. 4.

The bitstream protocol used to encode the values shown in update status message table 400 are shown as hexadecimal values for clarity, but would typically be provided as a string of bits for each device status information category. In this example, the order of the information categories is predetermined, and each bitstream value is allocated a predetermined number of bits. Accordingly, a system that receives an update status message encoded with this bitstream protocol can readily interpret and decode the message to extract the various device status information values that are contained within the bitstream.

FIG. 5 is a sequence diagram that illustrates an operation of communication system 300 in an exemplary embodiment. In this example, smartphone 301 maintains the device status information in a memory system as shown in update status message table 400. Smartphone 301 periodically updates the information in table 400 to ensure that data is always kept current. For example, smartphone 301 may monitor for changes that are relevant to any of the device status information categories and update the information in table 400 accordingly. By maintaining this information, smartphone 301 has the data readily available to generate and transmit an update status message in the event that smartphone 301 might lose the connection to its serving base station.

Eventually, the user of smartphone 301 attempts to power off the device by pressing the power button. In this example, the user of smartphone 301 is a child whose parent operates smartphone 302 and has subscribed to a locator service for the child's smartphone 301. When smartphone 301 is powered off, the locator service is no longer able to track its location. Thus, the child may be attempting to power off smartphone 301 in order to prevent the parent from locating smartphone 301, thereby concealing the child's location from the parent.

However, smartphone 301 is configured to detect the child's attempt to power off smartphone 301, and takes further steps to deliver the location information and other device status information in an update status message prior to allowing smartphone 301 to power off. Thus, smartphone 301 encodes the device status information in the bitstream protocol as shown in table 400 to generate an update status message for smartphone 302. Although smartphone 301 could transmit the update status message directly to smartphone 302 in some examples, in this example smartphone 301 transmits the update status message for delivery to device status system 330. Once smartphone 301 has successfully transmitted the message, smartphone 301 powers off as requested by the child user.

Device status system 330 receives the update status message in the bitstream protocol and decodes the message to extract the device status information contained therein. Device status system 330 then generates an SMS text message containing the device status information in a human-readable format for the user of smartphone 302. Device status system 330 then transmits the update status message as the SMS text message for delivery to smartphone 302. The parent user of smartphone 302 is thus informed of the location of the child's smartphone 301 immediately prior to smartphone 301 being powered off, and can take appropriate steps to ensure the safety and security of the child. In some examples, smartphone 301 could be configured to transmit a second update status message when smartphone 301 is powered back on or otherwise regains communication with a communication network, such as by establishing another wireless signal with a base station. In this manner, the parent will receive timely and pertinent updates to the device status of the child's smartphone 301.

Figure 6:
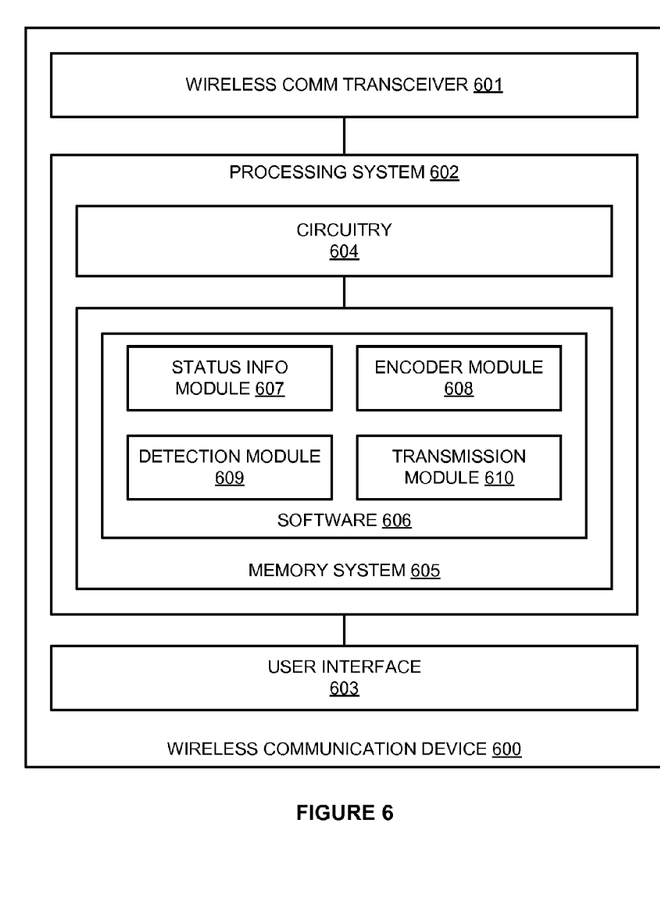
FIG. 6 is a block diagram that illustrates a wireless communication device.

FIG. 6 is a block diagram that illustrates wireless communication device 600. Wireless communication device 600 provides an example of wireless communication device 101, although device 101 could use alternative configurations. Wireless communication device 600 comprises wireless communication transceiver 601, processing system 602, and user interface 603. Processing system 602 is linked to wireless communication transceiver 601 and user interface 603. Processing system 602 includes processing circuitry 604 and memory system 605 that stores operating software 606. Operating software 606 comprises software modules 607-610. Wireless communication device 600 may include other well-known components such as a battery and enclosure that are not shown for clarity. Wireless communication device 600 may comprise a telephone, computer, e-book, mobile Internet appliance, media player, game console, wireless network interface card, or some other wireless communication apparatus—including combinations thereof.

Wireless communication transceiver 601 comprises RF communication circuitry and an antenna. The RF communication circuitry typically includes an amplifier, filter, RF modulator, and signal processing circuitry. Wireless communication transceiver 601 may also include a memory system, software, processing circuitry, or some other communication device. Wireless communication transceiver 601 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. In response to processing system 602 detecting a condition of wireless communication device 600 which could impede a connection with a wireless access node, wireless communication transceiver 601 is configured to transmit an update status message before the connection with the wireless access node is lost.

User interface 603 comprises components that interact with a user to receive user inputs and to present media and/or information. User interface 603 may include a speaker, microphone, buttons, lights, display screen, touch screen, touch pad, scroll wheel, communication port, or some other user input/output apparatus—including combinations thereof. User interface 603 may be omitted in some examples.

Processing circuitry 604 comprises microprocessor and other circuitry that retrieves and executes operating software 606 from memory system 605. Processing circuitry 604 may comprise a single device or could be distributed across multiple devices—including devices in different geographic areas. Processing circuitry 604 may be embedded in various types of equipment. Memory system 605 comprises a non-transitory computer readable storage medium, such as a disk drive, flash drive, data storage circuitry, or some other hardware memory apparatus. Memory system 605 may comprise a single device or could be distributed across multiple devices—including devices in different geographic areas. Memory system 605 may be embedded in various types of equipment. Processing circuitry 604 is typically mounted on a circuit board that may also hold memory system 605 and portions of wireless communication transceiver 601 and user interface 603. Operating software 606 comprises computer programs, firmware, or some other form of machine-readable processing instructions. Operating software 606 may include an operating system, utilities, drivers, network interfaces, applications, or some other type of software. In this example, operating software 606 comprises software modules 607-610, although software 606 could have alternative configurations in other examples.

When executed by processing circuitry 604, operating software 606 directs processing system 602 to operate wireless communication device 600 as described herein for wireless communication device 101. In particular, operating software 606 directs processing system 602 to maintain device status information in memory system 605 of wireless communication device 600. Further, operating software 606 directs processing system 602 to encode the device status information to generate an update status message in a bitstream protocol. In addition, operating software 606 directs processing system 602 to detect a condition of wireless communication device 600 which could impede a connection with a wireless access node. In response to processing system 602 detecting the condition of wireless communication device 600 which could impede the connection with the wireless access node, operating software 606 could direct processing system 602 to direct wireless communication transceiver 601 to transmit an update status message before the connection with the wireless access node is lost.

In this example, operating software 606 comprises a status information software module 607 that maintains device status information in memory system 605 of wireless communication device 600. Additionally, operating software 606 comprises an encoder software module 608 that encodes the device status information to generate an update status message in a bitstream protocol. Operating software 606 also comprises a detection software module 609 that detects a condition of wireless communication device 600 which could impede a connection with a wireless access node. Finally, operating software 606 comprises a transmission software module 610 that, in response to detection software module 609 detecting the condition of wireless communication device 600 which could impede the connection with the wireless access node, transmits an update status message before the connection with the wireless access node is lost.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, the method comprising:
in a wireless communication device, maintaining device status information in a memory system;

in the wireless communication device, encoding the device status information to generate an update status message in a bitstream protocol and maintaining the update status message in the memory system;

in the wireless communication device, after generating the update status message, detecting an imminent loss of connection between the wireless communication device and a wireless access node, and in response to detecting the imminent loss of connection, transmitting the update status message to the wireless access node before the connection with the wireless access node is lost; and in the wireless access node, decoding the bitstream encoded update status message to generate a message in a human-readable format and transferring the message for delivery to a second wireless device.

2. The method of claim 1 wherein detecting the imminent loss of connection comprises detecting when the wireless communication device is powering off.

3. The method of claim 1 wherein detecting the imminent loss of connection comprises detecting when the wireless communication device is entering airplane mode.

4. The method of claim 1 wherein detecting the imminent loss of connection comprises detecting when the wireless communication device is roaming.

5. The method of claim 1 wherein detecting the imminent loss of connection comprises detecting a reduction in signal strength of the connection with the wireless access node.

6. The method of claim 1 wherein detecting the imminent loss of connection comprises detecting low battery power of the wireless communication device.

7. The method of claim 1 wherein transmitting the update status message comprises transmitting the update status message for delivery to a second wireless communication device.

8. The method of claim 1 wherein transmitting the update status message comprises transmitting the update status message for delivery to a device status system.

9. The method of claim 1 wherein the device status information comprises a location of the wireless communication device.

10. The method of claim 1 wherein the device status information comprises battery power status of the wireless communication device.

11. A wireless communication system comprising:

a wireless communication device configured to maintain device status information in a memory system, encode the device status information to generate an update status message in a bitstream protocol and maintain the update status message in the memory system;

the wireless communication device configured to detect an imminent loss of connection between the wireless communication device and a wireless access node, wherein the imminent loss of connection is detected after the update status message is generated;

the wireless communication device configured to transmit the update status message to the wireless access node before the connection with the wireless access node is lost; and a wireless access node configured to decode the bitstream encoded update status message to generate a message in a human-readable format and transfer the message for delivery to a second wireless device.

12. The wireless communication device of claim 11 wherein the processing system configured to detect the imminent loss of connection comprises the processing system configured to detect when the wireless communication device is powering off.

13. The wireless communication device of claim 11 wherein the processing system configured to detect the imminent loss of connection comprises the processing system configured to detect when the wireless communication device is entering airplane mode.

14. The wireless communication device of claim 11 wherein the processing system configured to detect the imminent loss of connection comprises the processing system configured to detect when the wireless communication device is roaming.

15. The wireless communication device of claim 11 wherein the processing system configured to detect the imminent loss of connection comprises the processing system configured to detect a reduction in signal strength of the connection with the wireless access node.

16. The wireless communication device of claim 11 wherein the processing system configured to detect the imminent loss of connection comprises the processing system configured to detect low battery power of the wireless communication device.

17. The wireless communication device of claim 11 wherein the wireless communication transceiver configured to transmit the update status message comprises the wireless communication transceiver configured to transmit the update status message for delivery to a second wireless communication device.

18. The wireless communication device of claim 11 wherein the wireless communication transceiver configured to transmit the update status message comprises the wireless communication transceiver configured to transmit the update status message for delivery to a device status system.

19. The wireless communication device of claim 11 wherein the device status information comprises a location of the wireless communication device.

20. A method of operating a wireless communication system, the method comprising:

in a wireless communication device, maintaining device status information in a memory system, wherein the device status information comprises a location of the wireless communication device;

in the wireless communication device, encoding the device status information to generate an update status message in a bitstream protocol and maintaining the update status message in the memory system;

in the wireless communication device, after generating the update status message, detecting an imminent loss of connection between the wireless communication device and a wireless access node and in response to detecting the imminent loss of connection, transmitting the update status message for delivery to a device status system before the connection with the wireless access node is lost; and in the wireless access node, decoding the bitstream encoded update status message to generate a message in a human-readable format and transferring the message for delivery to a second wireless device.

* * * * *